(12) United States Patent
Guan et al.

(10) Patent No.: US 10,691,427 B2
(45) Date of Patent: Jun. 23, 2020

(54) METHOD AND APPARATUS REUSING LISTCELL IN HYBRID APPLICATION

(71) Applicant: Alibaba Group Holding Limited, George Town (KY)

(72) Inventors: Weigang Guan, Hangzhou (CN); Danxia Shi, Hangzhou (CN); Wenhong Chen, Hagzhou (CN)

(73) Assignee: Alibab Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/119,224

(22) Filed: Aug. 31, 2018

(65) Prior Publication Data
US 2018/0364990 A1 Dec. 20, 2018

Related U.S. Application Data

(63) Continuation of application No. PCT/CN2017/074178, filed on Feb. 20, 2017.

(30) Foreign Application Priority Data
Mar. 2, 2016 (CN) .......................... 2016 1 0116409

(51) Int. Cl.
*G06F 8/36* (2018.01)
*G06F 8/30* (2018.01)
*G06F 16/957* (2019.01)
*G06F 8/20* (2018.01)

(52) U.S. Cl.
CPC .................. *G06F 8/36* (2013.01); *G06F 8/20* (2013.01); *G06F 8/312* (2013.01); *G06F 16/957* (2019.01); *Y02W 30/826* (2015.05)

(58) Field of Classification Search
CPC . G06F 16/957; G06F 8/38; G06F 8/20; G06F 8/312; G06F 8/36; Y02W 30/826

USPC .................................................. 717/100–135
See application file for complete search history.

(56) References Cited

U.S. PATENT DOCUMENTS

| 5,485,600 | A | * | 1/1996 | Joseph | ...................... | G06F 8/34 |
| | | | | | | 345/473 |
| 6,009,251 | A | * | 12/1999 | Ho | ...................... | G06F 17/5081 |
| | | | | | | 716/102 |
| 7,853,905 | B1 | * | 12/2010 | Cheong | ............... | G06F 17/5045 |
| | | | | | | 714/724 |

(Continued)

FOREIGN PATENT DOCUMENTS

| CN | 103279382 | 9/2013 |
| CN | 103336816 | 10/2013 |

(Continued)

OTHER PUBLICATIONS

Crosby et al., "BlockChain Technology: Beyond Bitcoin," Sutardja Center for Entrepreneurship & Technology Technica Report, Oct. 16, 2015, 35 pages.
Extended European Search Report in European Application No. 17759149.2, dated Jul. 25, 2019, 8 pages.
Nakamoto, "Bitcoin: A Peer-to-Peer Electronic Cash System," www.bitcoin.org, 2005, 9 pages.

(Continued)

*Primary Examiner* — Marina Lee
(74) *Attorney, Agent, or Firm* — Fish & Richardson P.C.

(57) ABSTRACT

A prototype of a ListCell is defined using a front end of a hybrid software application. A ListCell template is created based on the prototype of the ListCell. A ListCell is obtained by copying the ListCell template. The ListCell is filled with obtained ListCell content. Display of the ListCell is initiated.

14 Claims, 7 Drawing Sheets

(56) References Cited

U.S. PATENT DOCUMENTS

| | | | |
|---|---|---|---|
| 8,489,982 B2* | 7/2013 | Davis | G06F 16/9558 |
| | | | 715/212 |
| 10,410,257 B1* | 9/2019 | Choi | G06Q 30/0276 |
| 2008/0010590 A1* | 1/2008 | Curtis | G06F 16/9577 |
| | | | 715/246 |
| 2010/0031152 A1 | 2/2010 | Villaron et al. | |
| 2010/0071075 A1* | 3/2010 | Slater, Jr. | G06F 21/6209 |
| | | | 726/31 |
| 2010/0153866 A1* | 6/2010 | Sharoni | G06F 9/452 |
| | | | 715/762 |
| 2010/0211936 A1 | 8/2010 | Schmitz et al. | |
| 2011/0202871 A1* | 8/2011 | Bair | G06F 3/0482 |
| | | | 715/786 |
| 2011/0273464 A1 | 11/2011 | Brunner et al. | |
| 2012/0158893 A1* | 6/2012 | Boyns | G06F 16/9577 |
| | | | 709/217 |
| 2013/0024812 A1 | 1/2013 | Reeves et al. | |
| 2014/0089786 A1* | 3/2014 | Hashmi | G06F 17/2247 |
| | | | 715/234 |
| 2016/0328486 A1* | 11/2016 | Liang | G06F 17/2247 |
| 2018/0364990 A1* | 12/2018 | Guan | G06F 8/20 |

FOREIGN PATENT DOCUMENTS

| | | |
|---|---|---|
| CN | 103530018 | 1/2014 |
| CN | 103995884 | 8/2014 |
| CN | 104216909 | 12/2014 |
| CN | 104238881 | 12/2014 |
| CN | 104267934 | 1/2015 |
| CN | 104572098 | 4/2015 |
| CN | 104965914 | 10/2015 |
| CN | 105117154 | 12/2015 |
| KR | 20140019626 | 2/2014 |
| KR | 20140022137 | 2/2014 |
| KR | 101588592 | 2/2016 |
| TW | 201435798 | 9/2014 |

OTHER PUBLICATIONS

International Search Report by the International Searching Authority issued in International Application No. PCT/CN2017/074178 dated May 24, 2017; 9 pages.

* cited by examiner understand# METHOD AND APPARATUS REUSING LISTCELL IN HYBRID APPLICATION

CROSS-REFERENCE TO RELATED APPLICATIONS

This application is a continuation of PCT Application No. PCT/CN2017/074178, filed on Feb. 20, 2017, which claims priority to Chinese Patent Application No. 201610116409.9, filed on Mar. 2, 2016, and each application is hereby incorporated by reference in its entirety.

TECHNICAL FIELD

The present application relates to the computer field, and in particular, to a method and an apparatus reusing a ListCell in a hybrid application.

BACKGROUND

Hybrid development is developing programs by using both front-end development and native development. The front-end development is developing web pages and web apps based on technologies such as JavaScript, HTML, and CSS. The native development is programming based on native functions of local operating systems of smart devices, such as mobile phones. For example, native interface development based on systems such as iOS and Android. React is a JS framework produced by Facebook, and is a construction system for standardizing front-end development. React Native is launched by Facebook based on React standards, and is a technology implementation framework permitting native applications to be developed by using front-end technologies.

Hybrid development is a very popular development mode for current mobile software applications (or APPs). In a hybrid development mode, front-end web page development technology is used to develop interfaces and services, and native development is used to provide native capabilities of various OS, so that an APP can have front-end dynamic capability and a native experience effect.

A ListView is the most common presentation form of an APP and it is used to present a page including a list form content, presents a large number of ListCells with the same or similar structure in a list, and usually can support inclusion of various ListCell. The ListCells have basically the same presentation structure, and only information contents to be presented are different. A ListCell is a content presented in each row or each sub cell of the ListView. Because a screen has a limited display area, the screen can present only some ListCell contents of the ListView at the same time. Some of the other ListCells can scroll in the screen display area only by scrolling up and down, and correspondingly, some ListViews scroll out of the display area. Therefore, a number of ListCells that a user can see on the screen is limited. However, in current front-end technology, a front-end needs to trigger a Native framework to create instances and perform rendering for all ListCells. Consequently, computer performance can be wasted by the triggered Native framework. An existing ListView implementation solution on React Native is shown in FIG. 1. Because a ListCell is defined at a front-end layer, a React Native framework can only map an entire structure of a ListView to a native layer. Therefore, if the ListView has 100 ListCells, 100 ListCells are created at the native layer, and the 100 ListCells are arranged and rendered, which consumes both memory (for example, a computer memory) and time.

In a list scrolling process, a ListCell that has been moved out of the displayable area can be reused to present a ListCell that is to be moved to the displayable area. As such, memory and time needed for creating and arranging new ListCells can be reduced to improve performance. In current hybrid technology and in ListView development, a structure layout and a ListCell class are defined at the front-end, and the front-end triggers the native layer to create a ListCell instance. Therefore, due to limitations of front-end DOM rendering mechanisms, the native layer may not be able to efficiently reuse the ListCell because reconstructing a DOM can require higher computing costs.

In current native development, there are corresponding technologies for reusing ListCells. However, because front-end technology is used to develop pages in the hybrid technology, both a ListView and a ListCell are created at the front-end. If the ListCell is created and reused at the native layer, a ListCell class defined at the front-end cannot be transmitted to the native layer. In other words, an instance cannot be directly created at the native layer for the ListCell class defined by using JavaScript (JS) at the front-end. Therefore, currently, in hybrid development, there is no technology that can be used to reuse a front-end ListCell.

SUMMARY

An objective of the present application is to provide a method and an apparatus reusing a ListCell in a hybrid application, so as to resolve the problem that a structure and a class of a ListCell are defined at a front-end but the ListCell is created and reused at a native end in hybrid development.

According to an aspect of the present application, a method reusing a ListCell in a hybrid application is provided, where the method includes the following: defining a prototype of a ListCell at a front-end of the hybrid application; and obtaining the ListCell through copying at a native end of the hybrid application based on the prototype of the ListCell, and reusing the ListCell.

Further, in the method, the defining a prototype of a ListCell includes the following: defining a structure layout and a class of the prototype of the ListCell.

Further, in the method, the prototype of the ListCell is a prototype of a single ListCell.

Further, in the method, the obtaining the ListCell through copying based on the prototype of the ListCell includes the following: creating a ListCell template based on the prototype of the ListCell; obtaining the ListCell by copying the ListCell template; and filling an obtained ListCell content in the copied ListCell, and displaying the ListCell.

Further, in the method, the obtaining the ListCell by copying the ListCell template includes the following: traversing and obtaining all sub-views of the ListCell template; and creating a ListCell that includes all the sub-views and attributes of the sub-views.

Further, in the method, the filling an obtained ListCell content in the copied ListCell includes the following: filling the obtained ListCell content in each corresponding sub-view of the created ListCell.

Further, in the method, the ListCell content is obtained from the front-end.

Further, in the method, during obtaining the ListCell by copying the ListCell template, the number of copied ListCells is determined based on the number of ListCells that can be included and displayed in a display area.

Further, in the method, the reusing the ListCell includes the following: recycling a ListCell including the moved-out ListCell content as a reusable ListCell when a ListCell content is moved out of the display area; determining whether there is a reusable ListCell when a new ListCell content is to be moved to the display area; and if yes, filling the new ListCell content in the reusable ListCell, and displaying the ListCell; or if no, obtaining the ListCell by copying the ListCell template, filling the new ListCell content in the copied ListCell, and displaying the ListCell.

According to another aspect of the present application, an apparatus reusing a ListCell in a hybrid application is further provided, where the apparatus includes: a definition apparatus, configured to define a prototype of a ListCell at a front-end of the hybrid application; and a copy and reuse apparatus, configured to obtain the ListCell through copying at a native end of the hybrid application based on the prototype of the ListCell, and reuse the ListCell.

Further, in the apparatus, the definition apparatus is configured to define a structure layout and a class of the prototype of the ListCell.

Further, in the apparatus, the prototype of the ListCell is a prototype of a single ListCell.

Further, in the apparatus, the copy and reuse apparatus is configured to create a ListCell template based on the prototype of the ListCell, obtain the ListCell by copying the ListCell template, fill an obtained ListCell content in the copied ListCell, and display the ListCell.

Further, in the apparatus, the copy and reuse apparatus is configured to traverse and obtain all sub-views of the ListCell template, and create a ListCell that includes all the sub-views and attributes of the sub-views.

Further, in the apparatus, the copy and reuse apparatus is configured to fill the obtained ListCell content in each corresponding sub-view of the created ListCell.

Further, in the apparatus, the ListCell content is obtained from the front-end.

Further, in the apparatus, the copy and reuse apparatus is configured to determine the number of copied ListCells based on the number of ListCells that can be included and displayed in a display area.

Further, in the apparatus, the copy and reuse apparatus is configured to recycle a ListCell including the moved-out ListCell content as a reusable ListCell when a ListCell content is moved out of the display area; determine whether there is a reusable ListCell when a new ListCell content is to be moved to the display area; and if yes, fill the new ListCell content in the reusable ListCell, and display the ListCell; or if no, obtain the ListCell by copying the ListCell template, fill the new ListCell content in the copied ListCell, and display the ListCell.

Compared with the existing technology, in the present application, the prototype of the ListCell is defined at the front-end. The prototype of the ListCell is copied at the native end. The native end reuses an invisible ListCell based on a current list presentation location. As such, the prototype of the ListCell can be defined at the front-end, and the ListCell can be freely created, rendered, and reused at the native end. Therefore, not only the flexibility of defining the ListCell in the hybrid development can be reserved, but also the ListCell can be reused at the native end, thereby greatly improving the large-list presentation and operation performance. The core of the technical solutions of the present application is to resolve the problem that a structure and a class of a ListCell are defined at a front-end but the ListCell is created and reused at a native end in the hybrid application development, so as to reuse the ListCell on a list page and improve rendering and operation performance.

BRIEF DESCRIPTION OF DRAWINGS

Other features, objectives, and advantages of the present application become more apparent by reading detailed description of the non-limitative implementations with reference to the following accompanying drawings.

The same or similar reference numerals in the accompanying drawings represent the same or similar components.

DESCRIPTION OF IMPLEMENTATIONS

The following describes the implementations of the present application in detail with reference to the accompanying drawings.

In a typical configuration of the present application, a terminal device, a service network device, and a trusted party each include one or more central processing units (CPU), an input/output interface, a network interface, and a memory.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, a tape and disk storage or another magnetic storage device, or any other non-transmission media. The computer storage medium can be configured to store information that can be accessed by a computing device. As described in the present specification, the computer readable medium does not include a transitory computer readable medium such as a modulated data signal and a carrier.

Figure 1:
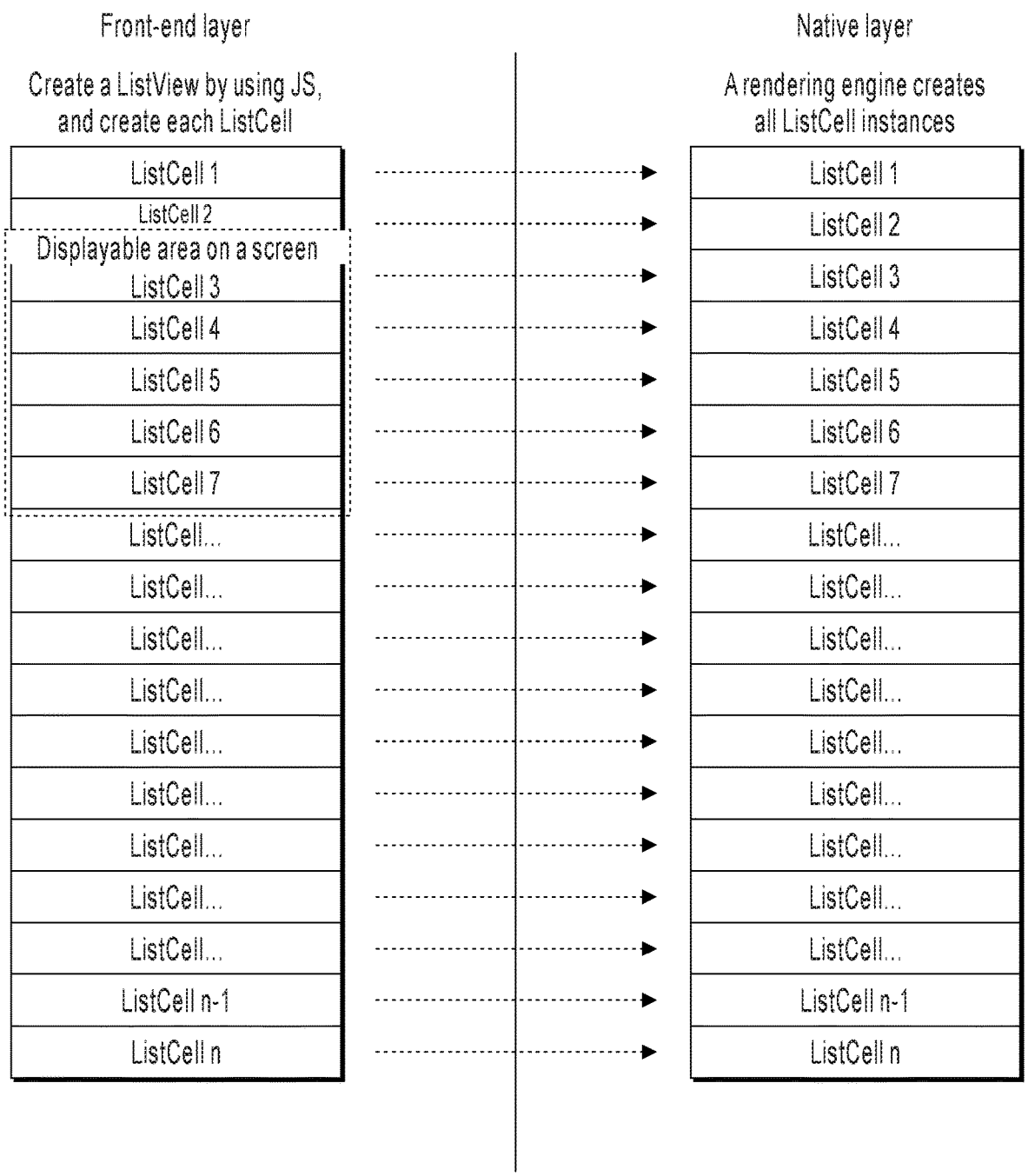
FIG. 1 shows an implementation of an existing ListView.
Figure 2:
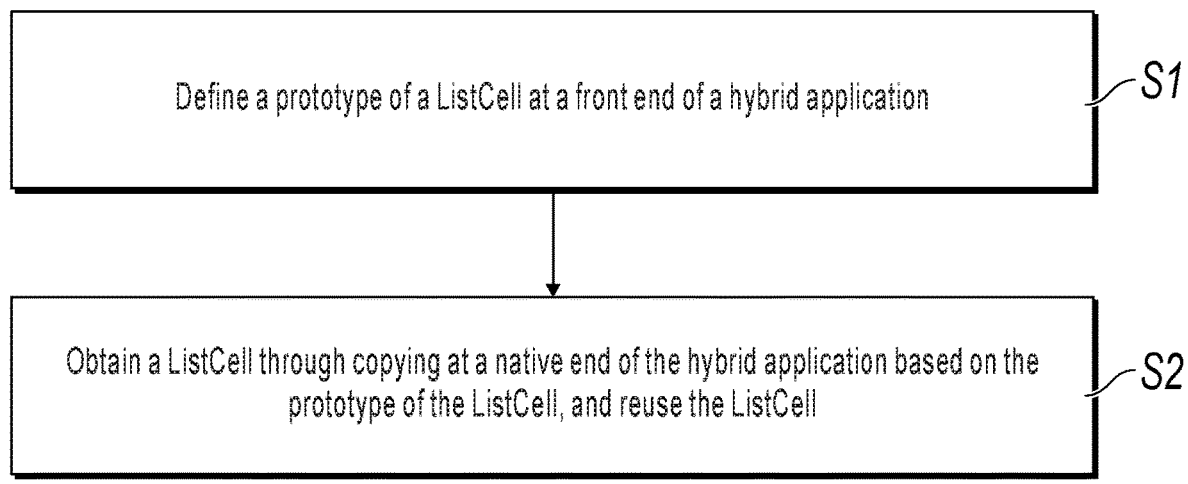
FIG. 2 is a flowchart illustrating a method reusing a ListCell in a hybrid application, according to an aspect of the present application.

As shown in FIG. 2, according to an aspect of the present application, a method reusing a ListCell in a hybrid application is provided. The method includes the following steps.

Step S1: Define a prototype of a ListCell at a front-end of the hybrid application.

Step S2: Obtain the ListCell through copying at a native end of the hybrid application based on the prototype of the ListCell, and reuse the ListCell. In the present application, the prototype (a parent) of the ListCell is defined at the front-end. The prototype of the ListCell is copied (cloned) at the native end (Native). The native end reuses an invisible ListCell based on a current list presentation location. As such, the prototype of the ListCell can be defined at the front-end, and the ListCell can be freely created, rendered, and reused at the native end. Therefore, not only the flexibility of defining the ListCell in the hybrid development can be reserved, but also the ListCell can be reused at the native end, thereby greatly improving the large-list presentation and operation performance. The core of the technical solution of the present application is to resolve the problem that a structure and a class of a ListCell are defined at a front-end but the ListCell is created and reused at a native end in the hybrid development. As such, the ListCell can be reused on a list page to improve the rendering and operation performance. The present application is applicable to all hybrid APP developments, and has a very good implementation effect in a React Native framework.

In an example implementation of the method reusing a ListCell in a hybrid application in the present application, step S1 of defining a prototype of a ListCell includes the following: defining a structure layout and a class of the prototype of the ListCell. Here, defining a prototype of a ListCell includes defining a structure and a class of the ListCell. As such, the ListCell can be flexibly defined at the front-end in the hybrid development.

In an example implementation of the method reusing a ListCell in a hybrid application in the present application, the prototype of the ListCell is a prototype of a single ListCell. Here, only one instance (that is, the prototype of the ListCell) is created at a front-end layer. Subsequently, a ListCell template can be created at the native end only based on the prototype. Then the ListCell template is copied as needed. As such, memory and time needed for creating and arranging new ListCells can be reduced to improve computing performance.

Figure 3:
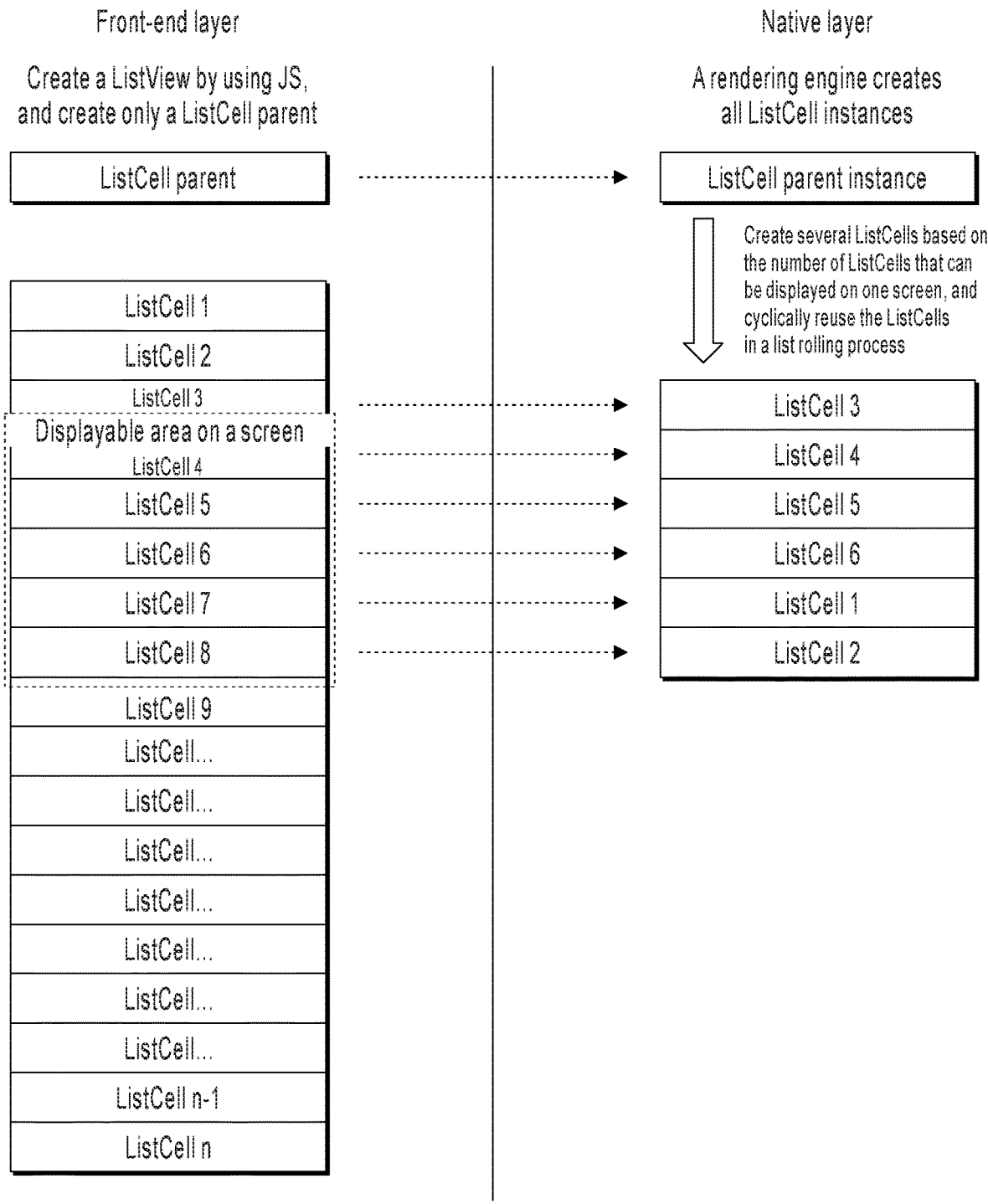
FIG. 3 is a principle diagram illustrating an example implementation of the present application.

In an example implementation of the method reusing a ListCell in a hybrid application in the present application, obtaining the ListCell through copying based on the prototype of the ListCell includes the following: creating a ListCell template based on the prototype of the ListCell; obtaining the ListCell by copying the ListCell template; and filling an obtained ListCell content in the copied ListCell, and displaying the ListCell. Here, as shown in FIG. 3, the ListCell template, that is, a ListCell prototype instance in the figure, is created at the native end only based on the prototype defined at the front-end. Then, the ListCell template is copied based on the number of ListCell contents that need to be displayed to obtain the corresponding number of ListCells. Then the ListCell contents, that is, ListCell data 1 to n in FIG. 3, are respectively filled in the corresponding ListCells for rendering and displaying. As such, the memory and time needed for creating and arranging new ListCells can be reduced to improve the performance.

Figure 4:
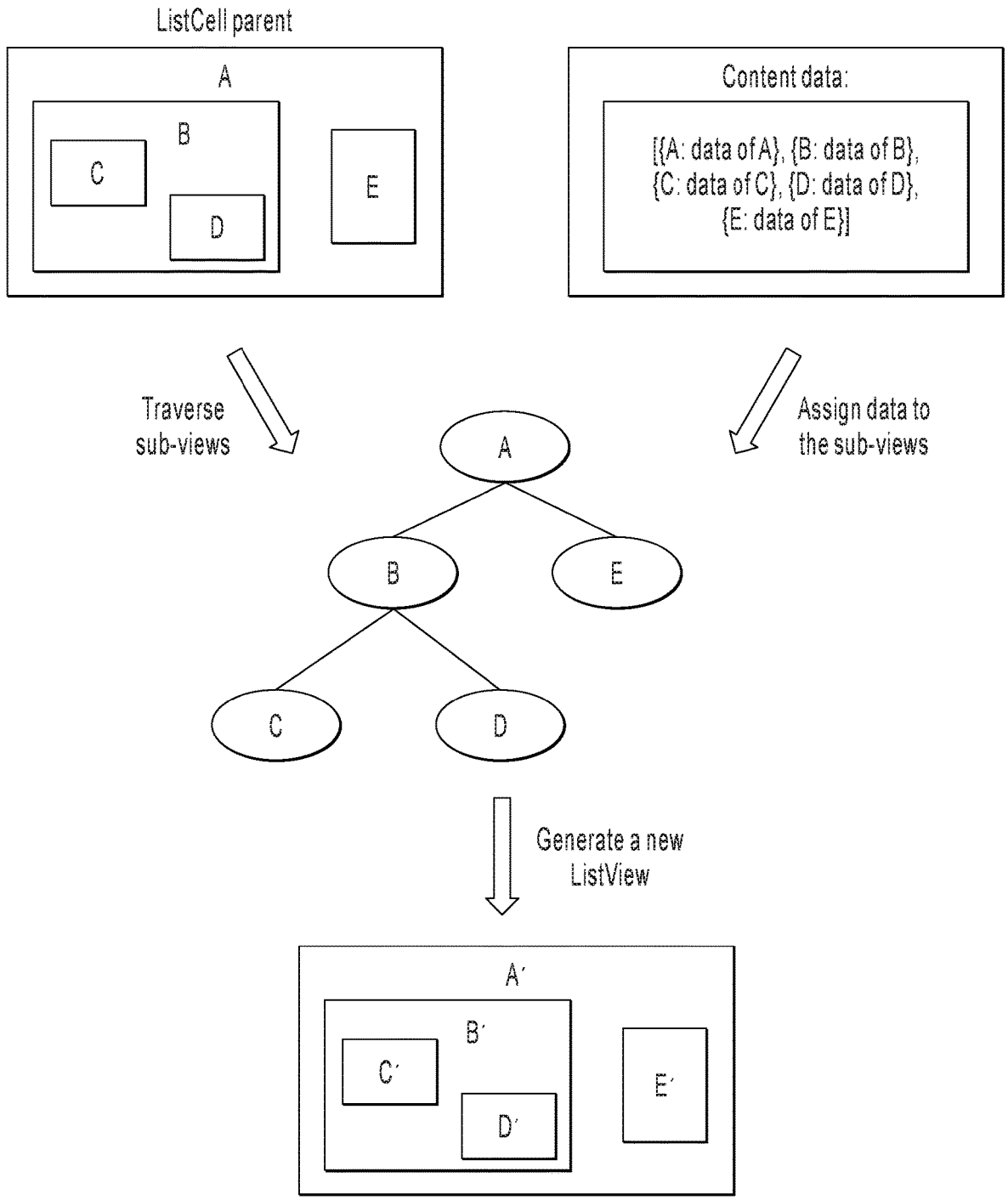
FIG. 4 is a principle diagram illustrating another example implementation of the present application.

In an example implementation of the method reusing a ListCell in a hybrid application in the present application, obtaining the ListCell by copying the ListCell template includes the following: traversing and obtaining all sub-views of the ListCell template; and creating a ListCell that includes all the sub-views and attributes of the sub-views. Here, all the sub-views (view) of the ListCell template are recursively traversed, and then a ListCell is obtained through copying to include all the sub-views and the attributes corresponding to the sub-views. As such, the ListCell can be accurately copied. As shown in FIG. 4, the ListCell template, that is, sub-views of a ListCell prototype in FIG. 4, includes A, B, C, D, and E. Copying the ListCell prototype is a process of creating a ListCell that includes all the sub-views of the ListCell prototype and attributes of the sub-views. Sub-views of the obtained ListCell include A', B', C', D', and E'.

In an example implementation of the method reusing a ListCell in a hybrid application in the present application, filling an obtained ListCell content in the copied ListCell includes the following: filling the obtained ListCell content in each corresponding sub-view of the created ListCell. Here, the ListCell content can be filled in each corresponding sub-view of the copied ListCell based on the ListCell content. As such, the ListCell content can be accurately displayed at a corresponding location in the ListCell. As shown in FIG. 4, in the present implementation, the ListCell contents, that is, content data in FIG. 4, are respectively filled in the corresponding sub-views A', B', C', D', and E' of the copied ListCell.

In an example implementation of the method reusing a ListCell in a hybrid application in the present application, the ListCell content is obtained from the front-end. Here, as shown in FIG. 3, in addition to defining the prototype of the ListCell, the front-end only needs to transmit the ListCell content, that is, the ListCell data in FIG. 3, to the native end. As such, memory and time consumed for front-end data processing can be reduced.

In an example implementation of the method reusing a ListCell in a hybrid application in the present application, during obtaining the ListCell by copying the ListCell template, the number of copied ListCells is determined based on the number of ListCells that can be included and displayed in a display area. Here, especially when a ListCell is displayed in the display area for the first time, because there is no reusable ListCell yet, the corresponding number of ListCells need to be obtained through copying based on the number of ListCells that can be included and displayed in the display area. For example, in FIG. 3, the corresponding number of ListCells is determined to be generated based on the number of ListCells that can be displayed on one screen. As such, the ListCell can be copied as needed, and the memory and time needed for creating and arranging new ListCells can be reduced to improve the performance. For example, 10 ListCell contents need to be displayed, and a display area can include and display 10 ListCells. In this case, 10 ListCells need to be copied.

In an example implementation of the method reusing a ListCell in a hybrid application in the present application, the reusing the ListCell includes the following: recycling a ListCell including the moved-out ListCell content as a reusable ListCell when a ListCell content is moved out of the display area; determining whether there is a reusable ListCell when a new ListCell content is to be moved to the display area; and if yes, filling the new ListCell content in the reusable ListCell, and displaying the ListCell; or if no, obtaining the ListCell by copying the ListCell template, filling the new ListCell content in the copied ListCell, and displaying the ListCell. Here, as shown in FIG. 3, especially when a ListCell is displayed in the display area for the first time, because there may already be a reusable ListCell at this time, the reusable ListCell can be used when a new ListCell content is displayed, that is, the ListCells in the display area are cyclically reused and moved in a list scrolling process. As such, the memory and time needed for creating and arranging new ListCells can be further reduced to improve the performance. Certainly, if there is no reusable ListCell, the ListCell template needs to be copied based on the new ListCell content to obtain a corresponding data ListCell. For example, 15 ListCell contents need to be displayed, and a display area can include and display 10 ListCells. In this case, 10 ListCells need to be copied in the first time of displaying, to display 10 ListCell contents. Five corresponding ListCell contents that have been displayed are moved out of the display area when the other five ListCell contents need to be moved to the display area for displaying. The five ListCells that are moved out of the display area can be recycled as reusable ListCells. Then, the five reusable ListCells can be reused for the other five ListCell contents.

Figure 5:
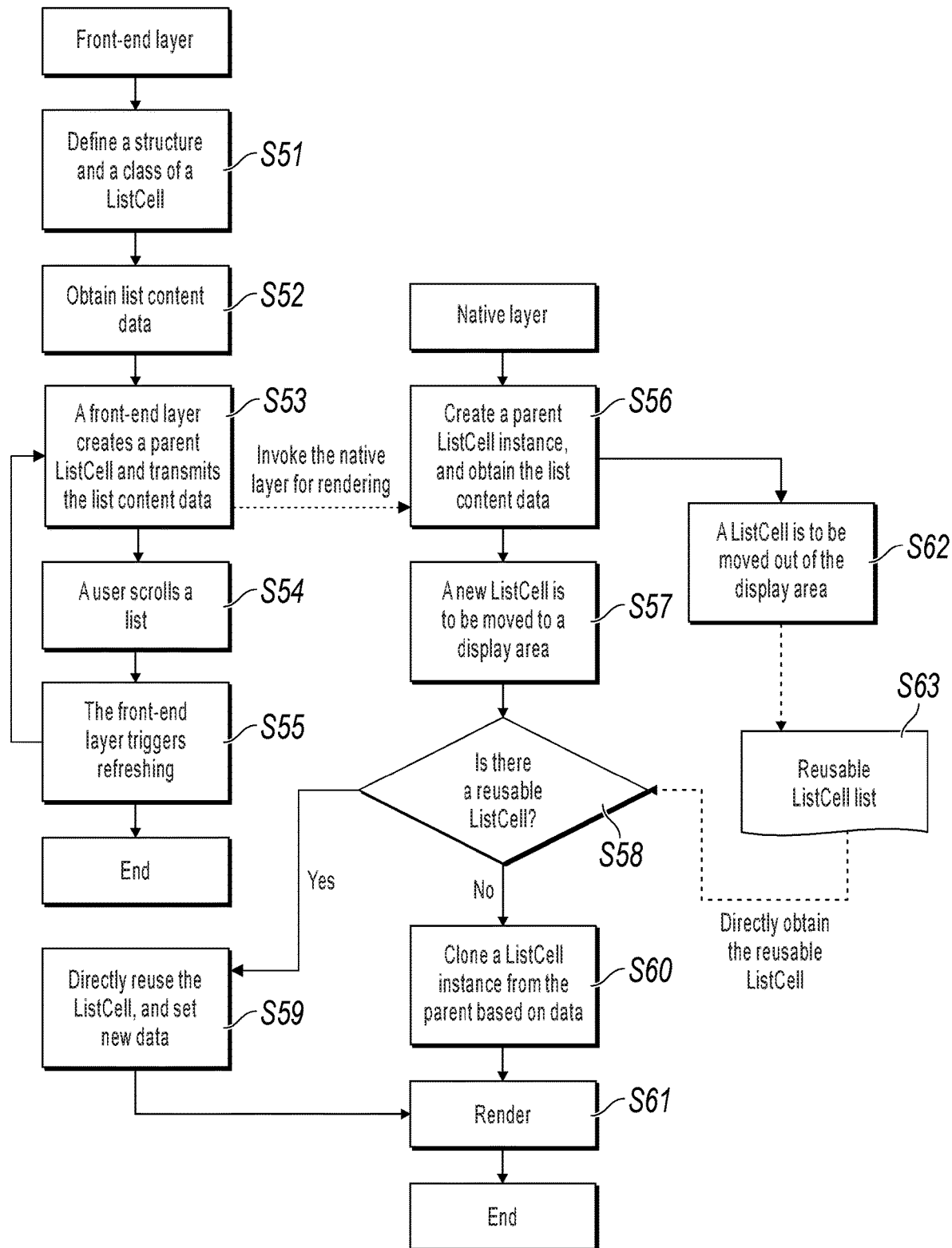
FIG. 5 is a principle diagram illustrating yet another example implementation of the present application.

As shown in FIG. 5, to better understand the principles and procedures of the present application, a hybrid framework (React Native) is used as an example to explain the implementation principles and procedures of the present application, which are as follows:

Step S51: A front-end layer defines a structure and a class of a ListCell.

Step S52: The front-end layer obtains list content data, that is, a ListCell content.

Step S53: The front-end layer creates a ListCell prototype based on the defined structure and class of the ListCell, transmits the list content data to a native end, and then goes to step S56.

Step S56: A native-end layer creates a ListCell prototype instance, that is, a ListCell template, based on the ListCell prototype created by the front-end layer.

Step S57: The native end determines that a new ListCell is to be moved to a display area, and goes to step S58.

Step S62 is performed at the same time as step S57: The native end determines that a ListCell is to be moved out of the display area, and goes to step S63.

Step S63: The native end uses the ListCell that is in the mobile display area as a reusable ListCell, and then goes to step S58.

Step S58: The native end determines whether there is a reusable ListCell.

If yes, step S59 is performed: The native end directly reuses the reusable ListCell, and then goes to step S61. Here, the native end determines ListCells that can be reused based on the number of ListCells that can be included and displayed in the displayable area.

If no, step S60 is performed: The native end copies a ListCell from the ListCell prototype instance based on the list content data, and then goes to step S61. Here, the native end copies other ListCells based on the list content data transmitted from the front-end layer.

Step S61: Render the ListCell, and then go to step S54.

Step S54: A front-end layer user scrolls a list.

Step S55: After triggering refreshing, the front-end layer goes to step S53. In this case, the ListCell prototype does not need to be created again, and only refreshed content data of the list is transmitted to the native end, that is, new list content data to be displayed.

Figure 6:
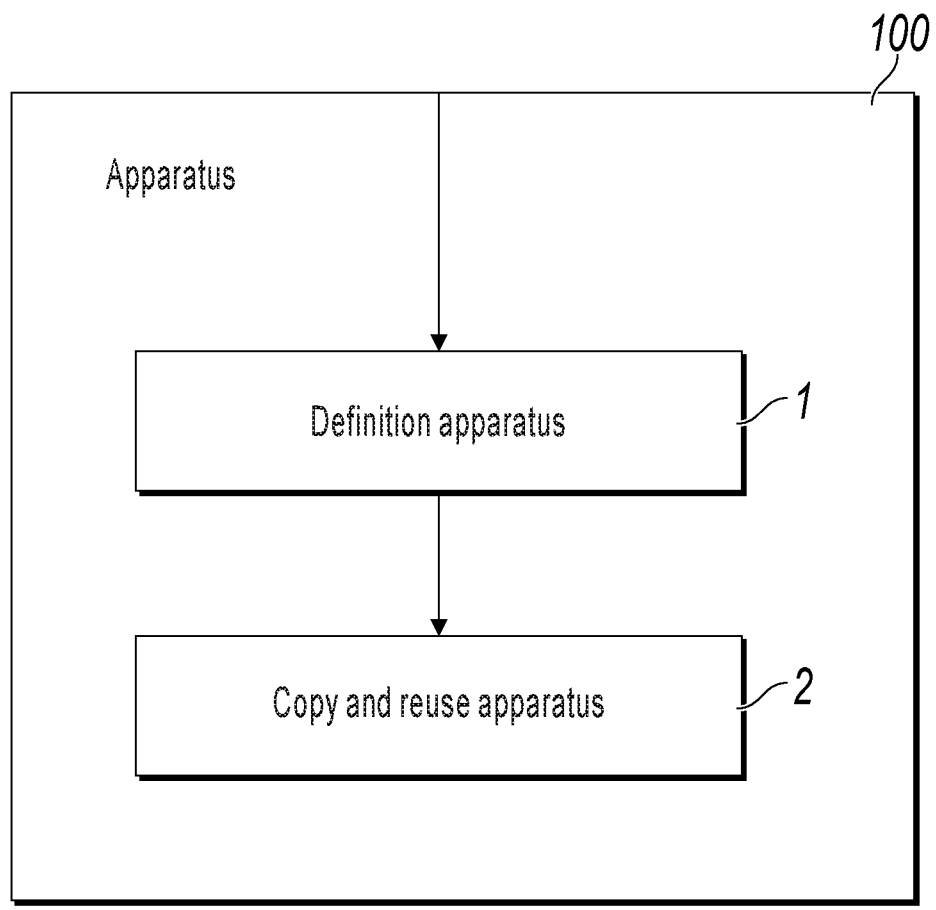
FIG. 6 is a diagram illustrating modules of an apparatus reusing a ListCell in a hybrid application, according to another aspect of the present application.

As shown in FIG. 6, according to another aspect of the present application, an apparatus reusing a ListCell in a hybrid application is further provided. The apparatus 100 includes: a definition apparatus 1, configured to define a prototype of a ListCell at a front-end of the hybrid application; and a copy and reuse apparatus 2, configured to obtain the ListCell through copying at a native end of the hybrid application based on the prototype of the ListCell, and reuse the ListCell. In the present application, the prototype of the ListCell is defined at the front-end. The prototype of the ListCell is copied at a native end (Native). The native end reuses an invisible ListCell based on a current list presentation location. As such, the prototype of the ListCell can be defined at the front-end, and the ListCell can be freely created, rendered, and reused at the native end. Therefore, not only the flexibility of defining the ListCell in the hybrid development can be reserved, but also the ListCell can be reused at the native end, thereby greatly improving the large-list presentation and operation performance. The core of the technical solution of the present application is to resolve the problem that a structure and a class of a ListCell are defined at a front-end but the ListCell is created and reused at a native end in the hybrid development. As such, the ListCell can be reused on a list page to improve the rendering and operation performance. The present application is applicable to all hybrid APP developments, and has a very good implementation effect in a React Native framework.

In an example implementation of the apparatus reusing a ListCell in a hybrid application in the present application, the definition apparatus 1 is configured to define a structure layout and a class of the prototype of the ListCell. Here, defining a prototype of a ListCell includes defining a structure and a class of the ListCell. As such, the ListCell can be flexibly defined at the front-end in the hybrid development.

In an example implementation of the apparatus reusing a ListCell in a hybrid application in the present application, the prototype of the ListCell is a prototype of a single ListCell. Here, only one instance (that is, the prototype of the ListCell) is created at a front-end layer. Subsequently, a ListCell template can be created at the native end only based on the prototype. Then the ListCell template is copied as needed. As such, memory and time needed for creating and arranging new ListCells can be reduced to improve the performance.

In an example implementation of the apparatus reusing a ListCell in a hybrid application in the present application, the copy and reuse apparatus 2 is configured to create a ListCell template based on the prototype of the ListCell, obtain a ListCell by copying the ListCell template, fill an obtained ListCell content in the copied ListCell, and display the ListCell. Here, as shown in FIG. 3, the ListCell template, that is, a ListCell prototype instance in the figure, is created at the native end only based on the prototype defined at the front-end. Then the ListCell template is copied based on the number of ListCell contents that need to be displayed, to obtain the corresponding number of ListCells. Then the ListCell contents, that is, ListCell data 1 to n in FIG. 3, are respectively filled in the corresponding ListCells for rendering and displaying. As such, the memory and time needed for creating and arranging new ListCells can be reduced to improve the performance.

In an example implementation of the apparatus reusing a ListCell in a hybrid application in the present application, the copy and reuse apparatus 2 is configured to traverse and obtain all sub-views of the ListCell template, and create a ListCell that includes all the sub-views and attributes of the sub-views. Here, all the sub-views (view) of the ListCell template are recursively traversed, and then a ListCell is obtained through copying to include all the sub-views and the attributes corresponding to the sub-views. As such, the ListCell can be accurately copied. As shown in FIG. 4, the ListCell template, that is, sub-views of a ListCell prototype in FIG. 4, includes A, B, C, D, and E. Copying the ListCell prototype is a process of creating a ListCell that includes all the sub-views of the ListCell prototype and attributes of the sub-views. Sub-views of the obtained ListCell include A', B', C', D', and E'.

In an example implementation of the apparatus reusing a ListCell in a hybrid application in the present application, the copy and reuse apparatus 2 is configured to fill the obtained ListCell content in each corresponding sub-view of the created ListCell. Here, the ListCell content can be filled in each corresponding sub-view of the copied ListCell based on the ListCell content. As such, the ListCell content can be accurately displayed at a corresponding location in the ListCell. As shown in FIG. 4, in the present implementation, the ListCell contents, that is, content data in FIG. 4, are respectively filled in the corresponding sub-views A', B', C', D', and E' of the copied ListCell.

In an example implementation of the apparatus reusing a ListCell in a hybrid application in the present application, the ListCell content is obtained from the front-end. Here, as shown in FIG. 3, in addition to defining the prototype of the ListCell, the front-end only needs to transmit the ListCell content, that is, the ListCell data in FIG. 3, to the native end. As such, memory and time consumed for front-end data processing can be reduced.

In an example implementation of the apparatus reusing a ListCell in a hybrid application in the present application, the copy and reuse apparatus 2 is configured to determine the number of copied ListCells based on the number of ListCells that can be included and displayed in a display area. Here, especially when a ListCell is displayed in the display area for the first time, because there is no reusable ListCell yet, the corresponding number of ListCells need to be obtained through copying based on the number of ListCells that can be included and displayed in the display area. For example, in FIG. 3, the corresponding number of ListCells is determined to be generated based on the number of ListCells that can be displayed on one screen. As such, the ListCell can be copied as needed, and the memory and time needed for creating and arranging new ListCells can be reduced to improve the performance. For example, 10 ListCell contents need to be displayed, and a display area can include and display 10 ListCells. In this case, 10 ListCells need to be copied.

In an example implementation of the apparatus reusing a ListCell in a hybrid application in the present application, the copy and reuse apparatus 2 is configured to recycle a ListCell including the moved-out ListCell content as a reusable ListCell when a ListCell content is moved out of the display area; determine whether there is a reusable ListCell when a new ListCell content is to be moved to the display area; and if yes, fill the new ListCell content in the reusable ListCell, and display the ListCell; or if no, obtain the ListCell by copying the ListCell template, fill the new ListCell content in the copied ListCell, and display the ListCell. Here, as shown in FIG. 3, especially when a ListCell is displayed in the display area for the first time, because there may already be a reusable ListCell at this time, the reusable ListCell can be used when a new ListCell content is displayed, that is, the ListCells in the display area are cyclically reused and moved in a list scrolling process. As such, the memory and time needed for creating and arranging new ListCells can be further reduced to improve the performance. Certainly, if there is no reusable ListCell, the ListCell template needs to be copied based on the new ListCell content to obtain a corresponding data ListCell. For example, 15 ListCell contents need to be displayed, and a display area can include and display 10 ListCells. In this case, 10 ListCells need to be copied in the first time of displaying, to display 10 ListCell contents. Five corresponding ListCell contents that have been displayed are moved out of the display area when the other five ListCell contents need to be moved to the display area for displaying. The five ListCells that are moved out of the display area can be recycled as reusable ListCells. The five reusable ListCells can be reused for the other five ListCell contents.

In conclusion, in the present application, the prototype of the ListCell is defined at the front-end. The prototype of the ListCell is copied at the native end. The native end reuses an invisible ListCell based on a current list presentation location. As such, the prototype of the ListCell can be defined at the front-end, and the ListCell can be freely created, rendered, and reused at the native end. Therefore, not only the flexibility of defining the ListCell in the hybrid development can be reserved, but also the ListCell can be reused at the native end, thereby greatly improving the large-list presentation and operation performance. The core of the technical solution of the present application is to resolve the problem that a structure and a class of a ListCell are defined at a front-end but the ListCell is created and reused at a native end in the hybrid application development, so as to reuse the ListCell on a list page and improve rendering and operation performance.

Apparently, a person skilled in the art can make various modifications and variations to the present application without departing from the spirit and scope of the present application. The present application is intended to cover these modifications and variations of the present application provided that they fall within the scope of protection defined by the following claims and their equivalent technologies.

It is worthwhile to note that the present application can be implemented in software and/or a combination of software and hardware. For example, the present application can be implemented by using an application-specific integrated circuit (ASIC), a general purpose computer, or any other similar hardware device. In an implementation, a software program in the present application can be executed by a processor, so as to implement the previous steps and functions. Similarly, the software program in the present application (including a related data structure) can be stored in a computer readable recording medium, for example, a RAM memory, a magnetic or optical drive, or a floppy disk and a similar device. In addition, some steps or functions in the present application can be implemented by using hardware, for example, a circuit that cooperates with the processor to execute the steps or the functions.

In addition, a part of the present application can be implemented as a computer program product, such as a computer program instruction. When the computer program instruction is executed by a computer, the methods and/or the technical solutions based on the present application can be invoked or provided by using operations of the computer. In addition, the program instruction for invoking the method in the present application can be stored in a fixed or removable recording medium, and/or is transmitted by using broadcast or a data flow in other signal bearer media, and/or is stored in an operating memory of a computer device that operates based on the program instruction. Here, an implementation according to the present application includes an apparatus, and the apparatus includes a memory configured to store a computer program instruction and a processor configured to execute the program instruction. When the computer program instruction is executed by the processor, the computer program instruction triggers the apparatus to operate based on the preceding methods and/or technical solutions in a plurality of implementations according to the present application.

It is apparent to a person skilled in the art that the present application is not limited to the details of the previous example implementations, and the present application can be implemented in another specific form without departing from the spirit or essential feature of the present application. Therefore, the implementations should be considered as illustrative and not restrictive in every aspect, and the scope of the present application is limited by the appended claims, rather than the above description. Therefore, the present application covers all changes within the meaning and the scope of the equivalent elements of the claims. Any reference numeral in the claims should not be considered as a limitation on the related claims. In addition, it is clear that the word "include" does not exclude another unit or step, and the singular does not exclude the plural. A plurality of units or apparatuses described in the apparatus claims can also be implemented by one unit or apparatus by using software or hardware. The words such as "first" and "second" are used to indicate names instead of any particular order.

Figure 7:
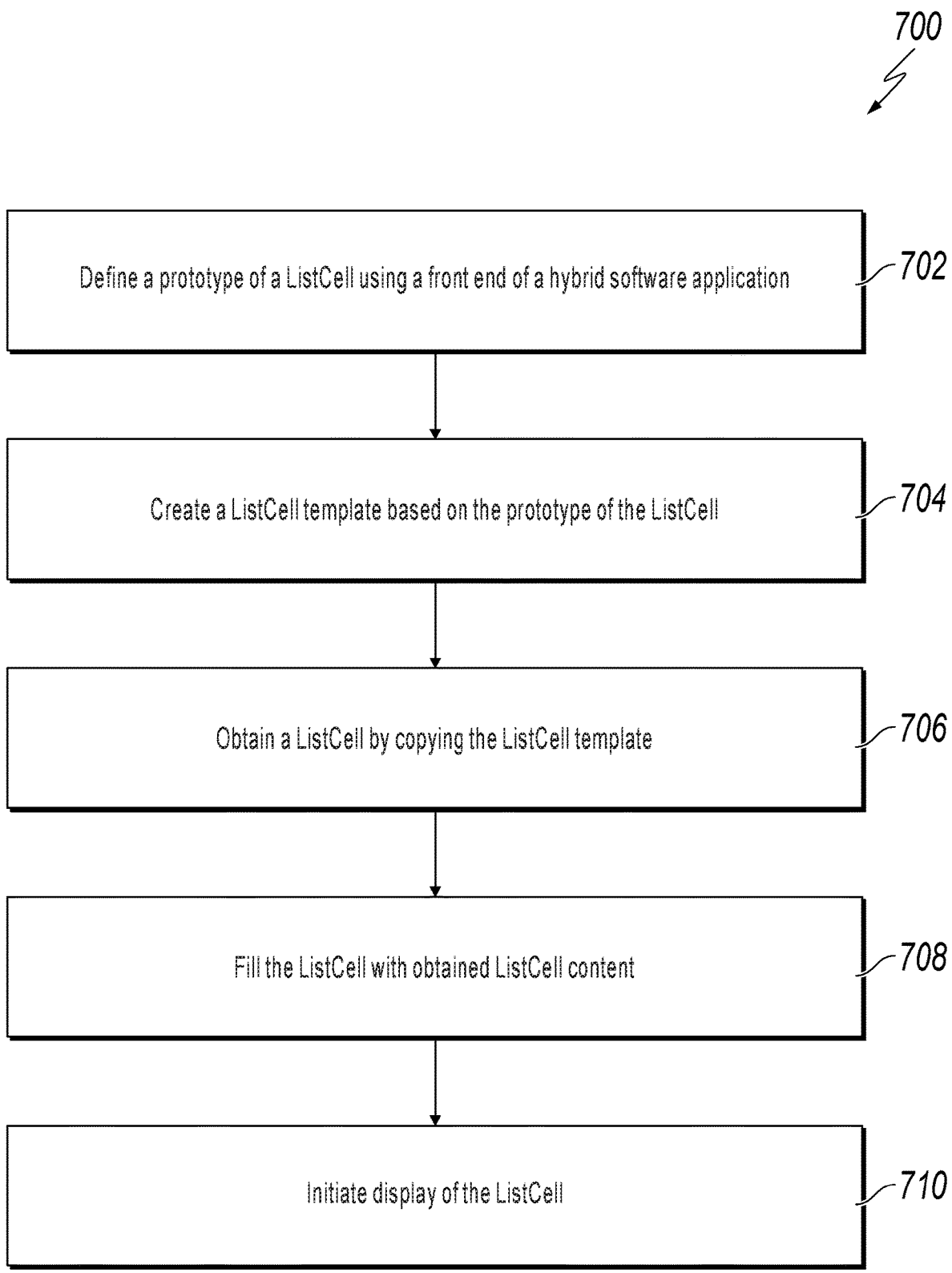
FIG. 7 is a flowchart illustrating an example of a computer-implemented method for reusing a ListCell in a hybrid application, according to an implementation of the present disclosure.

FIG. 7 is a flowchart illustrating an example of a computer-implemented method 700 for reusing a ListCell in a hybrid application, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a prototype of a ListCell is defined using a front end of a hybrid software application. In some implementations, defining the prototype of the ListCell includes defining a structure layout and a class of the prototype of the ListCell. In some implementations, the prototype of the ListCell is a prototype of a single ListCell. From 702, method 700 proceeds to 704.

At 704, a ListCell template is created based on the prototype of the ListCell. From 704, method 700 proceeds to 706.

At 706, a ListCell is obtained by copying the ListCell template. In some implementations, the ListCell template is copied at a native end of the hybrid software application. In some implementations, obtaining the ListCell comprises: traversing and obtaining all sub-views of the ListCell template and creating a ListCell that comprises all the sub-views and attributes of the sub-views. In some implementations, during obtaining the ListCell by copying the ListCell template, a number of copied ListCells is determined based on a number of ListCells that can be displayed in a computer display area. From 706, method 700 proceeds to 708.

At 708, the ListCell is filled with obtained ListCell content. In some implementations, filling the ListCell includes filling the obtained ListCell content in each corresponding sub-view of the created ListCell. In some implementations, the obtained ListCell content is obtained from the front end of the hybrid software application. From 708, method 700 proceeds to 710. At 710, display of the ListCell is initiated. After 710, method 700 stops.

In some implementations, the ListCell is reused, where reusing the ListCell includes: 1) recycling a ListCell as a reusable ListCell by removing the ListCell content from the reusable ListCell when the ListCell content of the reusable ListCell is moved out of the computer display area and 2) determining whether there is a reusable ListCell when new ListCell content is to be moved to the computer display area. If it is determined that there is a reusable ListCell, the reusable ListCell is filled with the new ListCell content and displaying the reusable ListCell. Otherwise, if it is determined that there is not a reusable ListCell a new ListCell is obtained by copying the ListCell template, filling the new ListCell with the new ListCell content, and displaying the new ListCell.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    defining, by a front end layer of a hybrid software application, a prototype of a ListCell;
    creating, by a native layer of the hybrid software application, a ListCell template based on a created prototype of the ListCell defined by the front end layer;
    obtaining, by the native layer, a ListCell by copying the ListCell template;
    obtaining, by the native layer, first ListCell content transmitted from the front end layer;
    filling, by the native d layer, the ListCell with the obtained first ListCell content;
    initiating, by the native layer, display of the ListCell having the first ListCell content; and
    reusing, by the native layer, the ListCell, comprising:
        in response to a user input, determining that the first ListCell content has been moved out of a display area of the native layer,
        in response, removing the first ListCell content from the ListCell,
        obtaining second ListCell content transmitted from the front end layer, and
        refilling the ListCell with the second ListCell content.

2. The computer-implemented method of claim 1, wherein defining the prototype of the ListCell comprises defining a structure layout and a class of the prototype of the ListCell.

3. The computer-implemented method of claim 1, wherein obtaining the ListCell comprises:
    traversing and obtaining all sub-views of the ListCell template; and
    creating a ListCell that comprises all the sub-views and attributes of the sub-views.

4. The computer-implemented method of claim 3, wherein filling the ListCell comprises filling the obtained first ListCell content in each corresponding sub-view of the created ListCell, wherein the obtained first ListCell content is obtained from the front end of the hybrid software application.

5. The computer-implemented method of claim 1, comprising, during obtaining the ListCell by copying the ListCell template, a number of copied ListCells is determined based on a number of ListCells that can be displayed in a computer display area.

6. A non-transitory, computer-readable medium storing one or more instructions executable by a computer system to perform operations comprising:
- defining, by a front end layer of a hybrid software application, a prototype of a ListCell;
- creating, by a native layer of the hybrid software application, a ListCell template based on a created prototype of the ListCell defined by the front end layer;
- obtaining, by the native layer, a ListCell by copying the ListCell template;
- obtaining, by the native layer, first ListCell content transmitted from the front end layer;
- filling, by the native layer, the ListCell with the obtained first ListCell content;
- initiating, by the native layer, display of the ListCell having the first ListCell content; and
- reusing, by the native layer, the ListCell, comprising:
  - in response to a user input, determining that the first ListCell content has been moved out of a display area of the native layer,
  - in response, removing the first ListCell content from the ListCell,
  - obtaining second ListCell content transmitted from the front end layer, and
  - refilling the ListCell with the second ListCell content.

7. The non-transitory, computer-readable medium of claim 6, wherein defining the prototype of the ListCell comprises one or more instructions to define a structure layout and a class of the prototype of the ListCell.

8. The non-transitory, computer-readable medium of claim 6, wherein obtaining the ListCell comprises one or more instructions to:
- traverse and obtain all sub-views of the ListCell template; and
- create a ListCell that comprises all the sub-views and attributes of the sub-views.

9. The non-transitory, computer-readable medium of claim 8, wherein filling the ListCell comprises one or more instructions to fill the obtained first ListCell content in each corresponding sub-view of the created ListCell, wherein the obtained first ListCell content is obtained from the front end of the hybrid software application.

10. The non-transitory, computer-readable medium of claim 6, comprising, during obtaining the ListCell by copying the ListCell template, one or more instructions to determine a number of copied ListCells based on a number of ListCells that can be displayed in a computer display area.

11. A computer-implemented system, comprising:
- one or more computers; and
- one or more computer memory devices interoperably coupled with the one or more computers and having tangible, non-transitory, machine-readable media storing one or more instructions that, when executed by the one or more computers, perform one or more operations comprising:
  - defining, by a front end layer of a hybrid software application, a prototype of a ListCell;
  - creating, by a native layer of the hybrid software application, a ListCell template based on a created prototype of the ListCell defined by the front end layer;
  - obtaining, by the native layer, a ListCell by copying the ListCell template;
  - obtaining, by the native layer, first ListCell content transmitted from the front end layer;
  - filling, by the native layer, the ListCell with the obtained first ListCell content;
  - initiating, by the native layer, display of the ListCell having the first ListCell content; and
  - reusing, by the native layer, the ListCell, comprising:
    - in response to a user input, determining that the first ListCell content has been moved out of a display area of the native layer,
    - in response, removing the first ListCell content from the ListCell,
    - obtaining second ListCell content transmitted from the front end layer, and
    - refilling the ListCell with the second ListCell content.

12. The computer-implemented system of claim 11, wherein defining the prototype of the ListCell comprises one or more instructions to define a structure layout and a class of the prototype of the ListCell.

13. The computer-implemented system of claim 11, wherein obtaining the ListCell comprises one or more instructions to:
- traverse and obtain all sub-views of the ListCell template; and
- create a ListCell that comprises all the sub-views and attributes of the sub-views; and
- wherein filling the ListCell comprises one or more instructions to fill the obtained first ListCell content in each corresponding sub-view of the created ListCell, wherein the obtained first ListCell content is obtained from the front end of the hybrid software application.

14. The computer-implemented system of claim 11, comprising, during obtaining the ListCell by copying the ListCell template, one or more instructions to determine a number of copied ListCells based on a number of ListCells that can be displayed in a computer display area.

* * * * *

UNITED STATES PATENT AND TRADEMARK OFFICE
CERTIFICATE OF CORRECTION

PATENT NO.        : 10,691,427 B2
APPLICATION NO.   : 16/119224
DATED             : June 23, 2020
INVENTOR(S)       : Weigang Guan, Danxia Shi and Wenhong Chen Page 1 of 1

It is certified that error appears in the above-identified patent and that said Letters Patent is hereby corrected as shown below:

On the Title Page

Column 1 (Assignee), Line 1, delete "Alibab" and insert -- Alibaba --, therefor.

Column 2 (Other Publications), Line 2, delete "Technica" and insert -- Technical --, therefor.

In the Claims

Column 14, Line 39, in Claim 1 alter "native" delete "d".

Signed and Sealed this
First Day of September, 2020

Andrei Iancu
*Director of the United States Patent and Trademark Office*